(12) United States Patent
Barnett (10) Patent No.: US 6,591,976 B1
(45) Date of Patent: Jul. 15, 2003

(54) AUTOMATIC BUILDING MATERIAL TRANSFER DEVICE

(76) Inventor: Willard R. Barnett, 8235 Barry Rd., Indianapolis, IN (US) 46219

( * ) Notice: Subject to any disclaimer, the term of this patent is extended or adjusted under 35 U.S.C. 154(b) by 18 days.

(21) Appl. No.: 10/052,662

(22) Filed: Jan. 23, 2002

(51) Int. Cl.$^7$ ............................................. B65G 17/12
(52) U.S. Cl. ..................... 198/801; 198/728; 198/735.3
(58) Field of Search ............................ 198/728, 735.3, 198/801; 187/239–241, 245

(56) References Cited

U.S. PATENT DOCUMENTS

| | | | | |
|---|---|---|---|---|
| 478,263 A | * | 7/1892 | Moss | 198/801 |
| 665,022 A | * | 1/1901 | Levalley | 198/801 |
| 2,870,900 A | * | 1/1959 | Will | 198/801 |
| 2,995,236 A | * | 8/1961 | Berger | 198/801 |

* cited by examiner

Primary Examiner—Joseph E. Valenza
(74) Attorney, Agent, or Firm—Robert A. Spray

(57) ABSTRACT

A novel and advantageous carrier mechanism, primarily useful for raising roofing shingle bundles, automatically by control by the user to lift and carry one or more of the shingle bundles or other items.

A frame carries a plurality of co-operating features, including a driving mechanism, an electric motor, a pair of chains and their sprockets, and when one of the shelf brackets gets to a top dead center position, the object falls in an orderly fashion due to a baffle, with succeeding shelf brackets sequentially reaching the top dead center position.

The mechanism s is provided to have a sort of "stop and go" operativity, providing a safety control. Safety is further provided by a cam mechanism which assures only an upward direction when carrying a bundle. Safety is further achieved by an angle bar gutter guard, preventing undue bending, leakage, or other damage to the gutter.

7 Claims, 5 Drawing Sheets

AUTOMATIC BUILDING MATERIAL TRANSFER DEVICE

FIELD OF THE INVENTION

The present invention relates to the construction industry, and more particularly to equipment to be used in the construction industry, power equipment of great and worldwide importance.

Still more particularly, the present invention relates to and provides mechanized equipment for the primary usefulness of raising items of building materials, particularly shingles, to a raised position of the roof edge of residential construction.

Further, the invention relates to a device in which a bundle of shingles may be raised from the ground to the roof automatically upon actuation control by the user.

Problems Inherent as to Roofing Material Raising

Considering primarily the field of asphalt shingles, and other type of shingles for residential housing construction, in general contrast to multi-floor commercial construction, the field of residential housing has had several problems for scores of years.

For example, the roofing is often considered to be in a sense a specialized task, and the cost of the roofing is a very significant part, of the overall job cost; and thus the roofing is often done by a specialized contractor or sub-contractor, often quite relatively costly labor. And the cost, when consideration is given to indirect costly additions such as injury compensation, insurance aspects, and other items of realistic cost a considerable savings may be considered by use of this power equipment.

The act of roofing requires human effort as to raised elevation of the roof of the residence; and the task is so objectionable that there may be expected a problem in the assignment of the task.

Whether or not a differential in wage factors is significant in any particular installation, the problem exists as to the raising of the shingles, ordinarily packaged and sold as bundles which are significantly heavy.

And for many years this task of raising the shingles to roof height has been considered such a burdensome task, that it is often referred to as a "back-breaking" effort.

As detailed further herein, some progress has been made for some sort of mechanicalized shingle-lifting apparatus, but the Prior Art known to this Inventor has stopped quite short of the advantageous invention of this patent, which solves problems for a practical, rugged, convenient to use, and cost-justified shingles carrier, which have not been attained by the Prior Art.

SUMMARY OF THE INVENTIVE CONCEPTS

The invention provides a novel and advantageous carrier, mechanism, primarily for the job of raising roofing shingle bundles, and this is achieved automatically in the sense of control by the user to lift and carry upwards one or more of such stacks or other items.

The device comprises a frame which carries a plurality of co-operating features, including a driving mechanism powered by an electric motor. The driving mechanism comprises a pair of chains and their associated sprockets; and the mechanical drive is such that when one of the shelf brackets carried by the chains reaches a top dead center position the object carried by the corresponding shelf bracket falls in an orderly fashion due to a baffle, providing convenience as the work progresses with succeeding shelf brackets sequentially reaching the top dead center position.

The mechanism is provided to have a sort of "stop and go" operativity, providing a safety control, avoiding the carry of one of the carried bundles until the previous bundle has finished its movement in which the baffle has moved that bundle to an out of the way position.

Further safety is provided by a cam mechanism which assures that the chains can move only in an upward direction when carrying a bundle.

Safety is further achieved by an angle bar gutter guard, preventing undue bending, leakage, or other damage to the gutter.

Other details are specified in the more detailed description which follows.

Prior Art Capability and motivations, as Helping Helping to Show Patentability Here Even in hindsight consideration of the present invention to determine its inventive and novel nature, it is not only conceded but emphasized that the prior art had many details usable in this invention, details of both capability and motivation, but only if the prior art had had the guidance of the present concepts of the present invention.

That is, it is emphasized that the prior art had/or knew several particulars which individually and accumulatively show the non-obviousness of this combination invention. E.g.:

a. The prior art has had various types of material transfer mechanisms, for scores of years, of many shapes, natures, sizes and power drives;

b. Such articles have included not only various types of equipment, but have included material transfer equipment both horizontally and vertically in operative effect;

c. Such varieties of material transfer equipment and installations are well known for many uses and manufacturing incidents;

d. Roof construction has used shingles of various forms, with a need for lifting them from ground level up to the height of the roof, which, in residential use, is a lifting distance in the order of eight feet or so, and there has always been a need for achieving lifting shingles, usually kept and handled as heavy bundles, and the need for help in such lifting has been known for scores of years;

e. The disadvantages as to the lack of a practical means for achieving this bothersome lifting task are so great and would likely have been noticed by so many users and workmen, that this invention might have been born out of need but only if its concepts had been obvious;

f. The ease of tooling for the present invention has surely given manufacturers ample incentive to have made articles and modifications for commercial competitiveness in a competitive industry, if the concepts had been obvious;

g. The features of the present invention are reasonably likely considered by manufacturers and users to be of such an obvious advantage that manufacturers and/or users would likely consider lifting equipment of this invention to have massive sales opportunities to a great multitude of persons; and thus manufacturers and/or users would have been likely to have developed this lifting equipment of this invention, if its concepts had been obvious;

h. The prior art has always had sufficient skill to make many types of lifting equipment, more than ample skill to have achieved the present invention, but only if the concepts and their combination had been conceived;

i. Substantially all, of the operational characteristics and advantages of details of the present invention, when considered separately from one another and when considered separately from the present invention's details and non-technical accomplishment of the details, are within the skill of persons of various arts, but only when considered away from the integrated and novel combination of concepts which by their cooperative combination achieves this advantageous invention;

j. The details of the present invention, when considered solely from the standpoint of construction, are exceedingly simple; and the matter of simplicity of construction has long been recognized as indicative of inventive creativity;

k. Similarly, and a long recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and l. Far from being in a specialized field in which only a relatively few specialists, builders, workmen, professional persons or experienced inventors could have perceived and overcome this practically universal problem, here the vast majority of all persons, for scores of years, must be realistically considered as prime candidates for this invention; and thus its non-obviousness seems proven by history.

Accordingly, although the prior art has had capability and motivation, amply sufficient to presumably give incentive to the development of a novel and practical shingle-lifting means to the, present invention, the fact remains that this invention awaited the creativity and inventive discovery of the present inventor. In spite of ample motivation and capability shown by the many illustrations herein, the prior art did not suggest this invention.

Prior Art as Particular Instances of Failure to Provide This Shingle-lifting Equipment of the Novel Nature In view of the industry motives and capabilities, it may be difficult to realize that the prior art has not projected itself to the combination purpose and achievement of the present invention, even though the need and use of helpful lifting equipment in residential construction is a widespread and quite universal factor, and the carpentry and power equipment industries are quite commercial and competitive. Further, shingle roofing contractors users surely include an uncountable multitude of inventors and other persons, even "do it yourself" homeowners, at least of sufficient experience, skill, etc., that the present invention would have been desired and attempted, and perhaps achieved, long ago, but only if its factors and combination-nature had been obvious.

Summary of the Prior Art's Lack of Suggestion of the Concepts of the Invention's Combination In spite of all such factors of the prior art, the problem here solved awaited the inventor's consideration, ideas, and creativity. More particularly as to the novelty here of the invention as considered as a whole, the summary of the prior art uses and needs helps show its contrast to the present concepts, and emphasizes the advantages, novelty, and the inventive significance of the present concepts as are here shown, particularly as to utility and convenience of use as detailed herein, as to apparatus and a procedure.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of an economical powered material-lifting device feature achieving the convenience, ease of movability to any selected location, ease of use, simplicity of use, and other advantages of the present invention, which are goals only approached by the prior art, must be recognized as being a long-felt need accomplished.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount or realistic humility, to avoid consideration of this invention improperly by hindsight, requires the concepts and achievements here to be realistically viewed as a novel combination, inventive in nature, and especially is this a realistic consideration when viewed from the position of a person of ordinary, skill in this art at the time of this invention, and without trying to reconstruct this invention from the prior art without use of hindsight toward particulars not suggested by the prior art.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment, taken in conjunction with the accompanying Drawings, which are of somewhat schematic and diagrammatic nature for showing the inventive concepts; and in the Drawings.

DETAILED DESCRIPTION OF ILLUSTRATIVE EMBODIMENT

Figure 1:
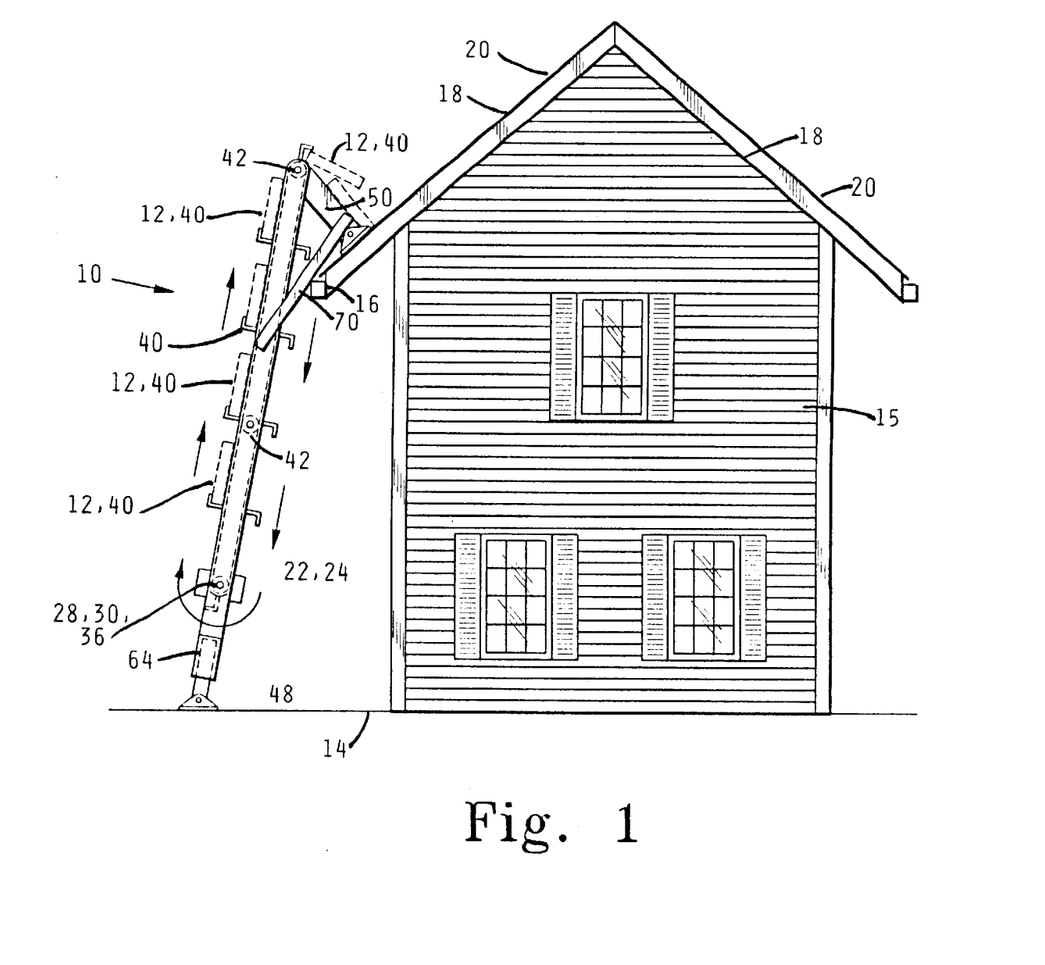
FIG. 1 is a composite elevation view, illustrating the material transfer device according to the present invention's concepts, in an illustrative use placed appropriately and in a leaning condition being supported by a house, reference arrows showing it in greater detail than FIG. 1, and, as in FIG. 1, illustrating the device as providing a plurality of carrier shelves one of which is shown as carrying a bundle of shingles, by an showing the travel of, a movable carrier body during actuation of the transfer device in its role of carrying bundles of shingles from the ground upwardly to the roof, the shingle bundles being shown in dash lines as is conventional for showing work objects.

The Drawings are schematic to illustrate a preferred embodiment of the overall invention, as generally referred to by the reference numeral 10, which provides a building material transfer device 10 for raising items or bundles of building materials 12 from an attendant standing on the ground 14, to a raised position operatively adjacent the associated house 15's roof's foremost portion 16. (The reference "foremost portion 16" is mentioned rather than the roof 18 or gutter 20 because with the device 10 properly installed as illustrated in FIG. 1, the roof 18 has a gutter 20 which is foremost and is thus the upper support for the device 10, for the shelf brackets 40 are not limited to conventional roofing bundles in use.)

The device 10 itself is illustrated as comprising several features, the most apparent being an overall frame member 22 which is shown as comprising, integrally, a pair of longitudinally extending main support members 24, which are shown (FIG. 2) as connected by connector member 26 holding the main support members 24 in fixed relationship.

Power for the operativity of the device 10 (See FIG. 2) is imparted by a driver shaft 28 which is carried by bearings (not shown) in the main support members 24 adjacent the bottom thereof.

Figure 2:
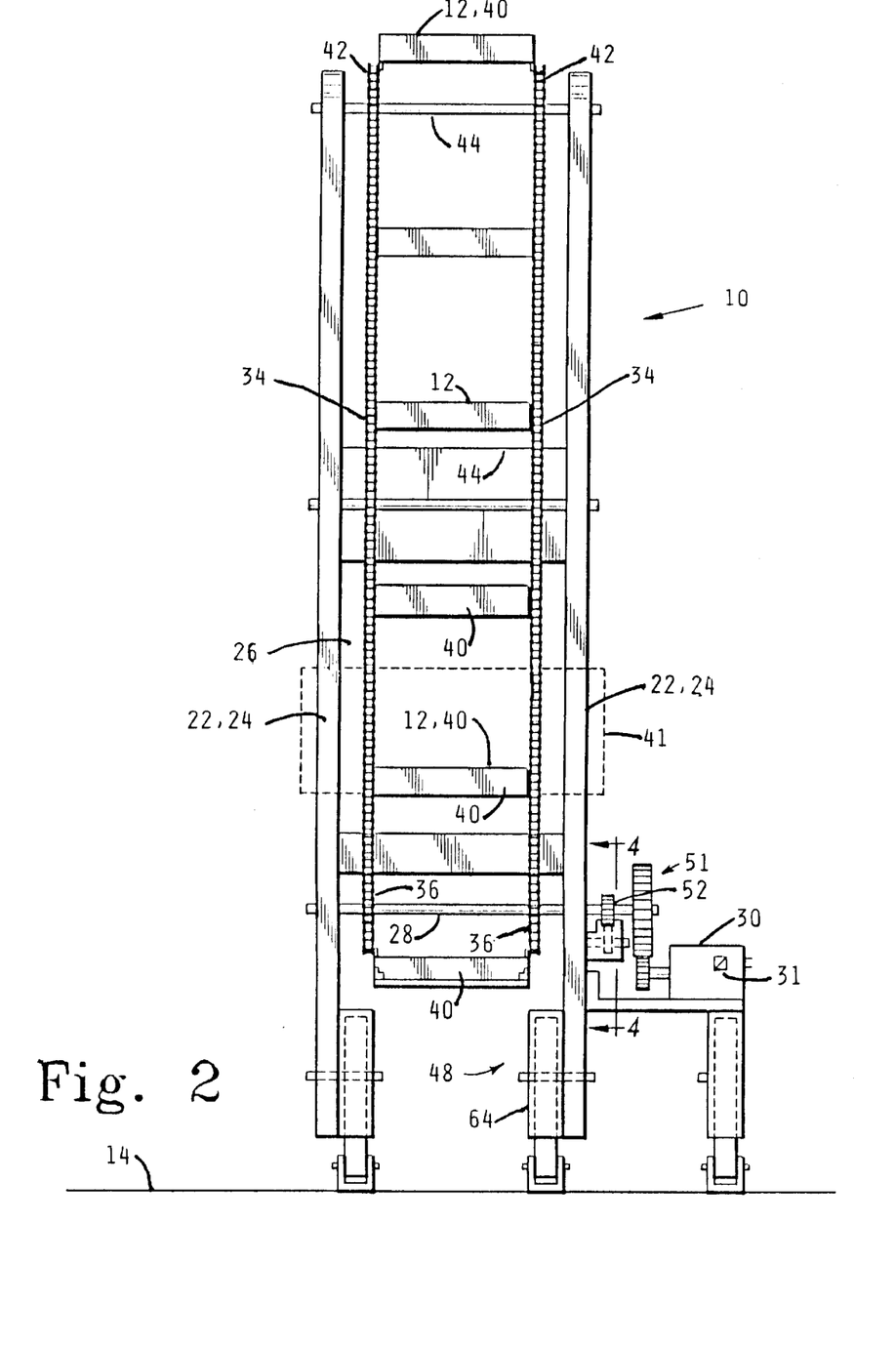
FIG. 2, in about twice the scale as FIG. 1, is a more detailed view of the material transfer device of this invention, illustrative dash-line showing of the material transfer device having a plurality of carrier shelves, FIG. 2 also showing an external power input by an electric motor; and, although the carry of the shelves is by two "closed loop" units of chain, the background loop sections are hidden in this view by the foreground sections of the chain loops.

Power for revolving the driver shaft 28 is shown as provided by an electric motor 30 which is desirably provided with specialized circuitry desirably including control switching means 31 for starting, stopping, and re-starting, all of which switching means are shown schematically as closely adjacent the standing location of the attendant.

The operativity of the switching means 31 is described below.

Actuators are shown schematically by numeral 32.

Referring again to the power actuation a pair of chains 34 are shown as powered by a pair of driver sprockets 36 (See FIG. 1) because in FIG. 2 the driver sprockets 36 are shown in edge view and thus are indicated in FIG. 2 as a line co-incident to the overlying portion of the Chains 34.

The driver sprockets 36 are operatively keyed to the driver shaft 28, and each of the chains 34 passes under a respective one of the driver sprockets 36 and is operative to receive rotary power from the driver shaft 28.

The pair of driver sprockets 36 are carried by the driver shaft 128 and are respectively located adjacent one of the main support members 24.

As shown, the driver shaft 28 extends outwardly through one of the main support members 24 (here the right-hand one) and is adapted to receive rotational power from the associated electric motor 30. The desirable power components are shown below.

For carrying the items or bundles of materials 12 to be raised to the roof's foremost portion, there is provided a plurality of shelf brackets 40 affixed to each of the chains 34 adjacent the said main support members 24, the respective shelf brackets 40 being spaced along the chains 34 such as to accommodate items of building materials 12 between adjacent shelf brackets 40. The items or bundles to be raised are shown as a schematic oversize panel 41, this being another advantage of the device 10.

There is one or more sets of idler sprockets 42 carried respectively on shafts 44 supported by the main support members 24. The set of idler sprockets 42 which are adjacent the top of the main support members 24 are spaced respectively close to the respective main support member 24, both of the top sprockets 42 being in the plane of the respective drive sprocket 36.

The main support members 24 are shown as provided with base portions 48 for accepting support from the ground 14, such that the lowermost one of the shelf brackets 40 is at a convenient height to accommodate the attendant's task in loading an item of associated building material 12 thereon.

The overall arrangement of electric switching and actuators is from prior art components such that with the motor 30 turned on and such an item of building materials 12 deposited on a shelf bracket 40, the item or bundle 12 will be carried by the shelf bracket 40 upwardly to a position adjacent the pair of topmost idler sprockets 42, and, as the chains 34 cause the shelf bracket 40 to pass adjacent a top dead-center position a baffle 50 causes the item or bundle 12 to fall off the shelf bracket 40 onto the roof 18, the control switching 31 then providing that the motor 30 will stop until the control switching 31 is actuated to be operative to re-start the motor 30 and after that re-starting, the motor 30 and the chains 34 will be operative to cause that shelf bracket 40 (now emptied of its item 12) to travel downwardly with the motor 30 again running until another shelf bracket 40 has moved upwardly to actuate the stop means 31.

Figure 3:
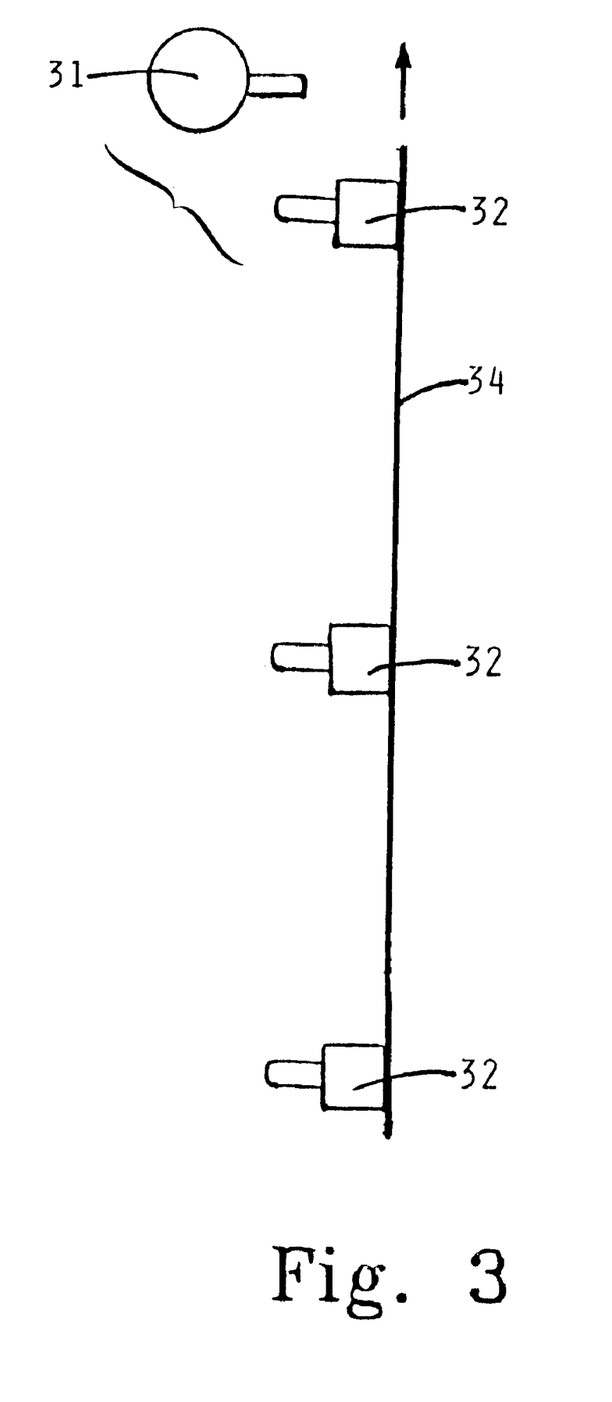
FIG. 3 is a schematic view of the actuation components which is integrated from prior art components into the overall operation of the transfer device.

This automatic stopping of the movement cycle of the chains 34, preventing the forcing of a subsequent load of building materials 12 to the roof area being attended by a workman on the roof, until he actuates the control switching 31 to re-start the motor 30. Further as to the automatic stopping of the chain-movement cycle, FIG. 3 shows schematically a series of actuators 32 clamped along the chain 34 and positioned therealong to sequentially engage a control abutment on the switch 31.

Suitable circuitry (not shown) connects the motor's switch 31, which is located as shown adjacent to bottom of the main support members 24 although it may be considered desirable to locate the switch 31 adjacent the top of support members 24 for switching control by the attendant on the roof 18.

In the illustrative embodiment shown, advantageously the power from the motor 30 to the main drive shaft 28 uses the feature (51) of cooperative gearing on the motor 30 and the driver shaft 28 being of a step-down relative nature for providing a slow revolving speed of the driver shaft 28 in comparison to the speed of the output shaft of the associated electric motor 30.

Figure 4:
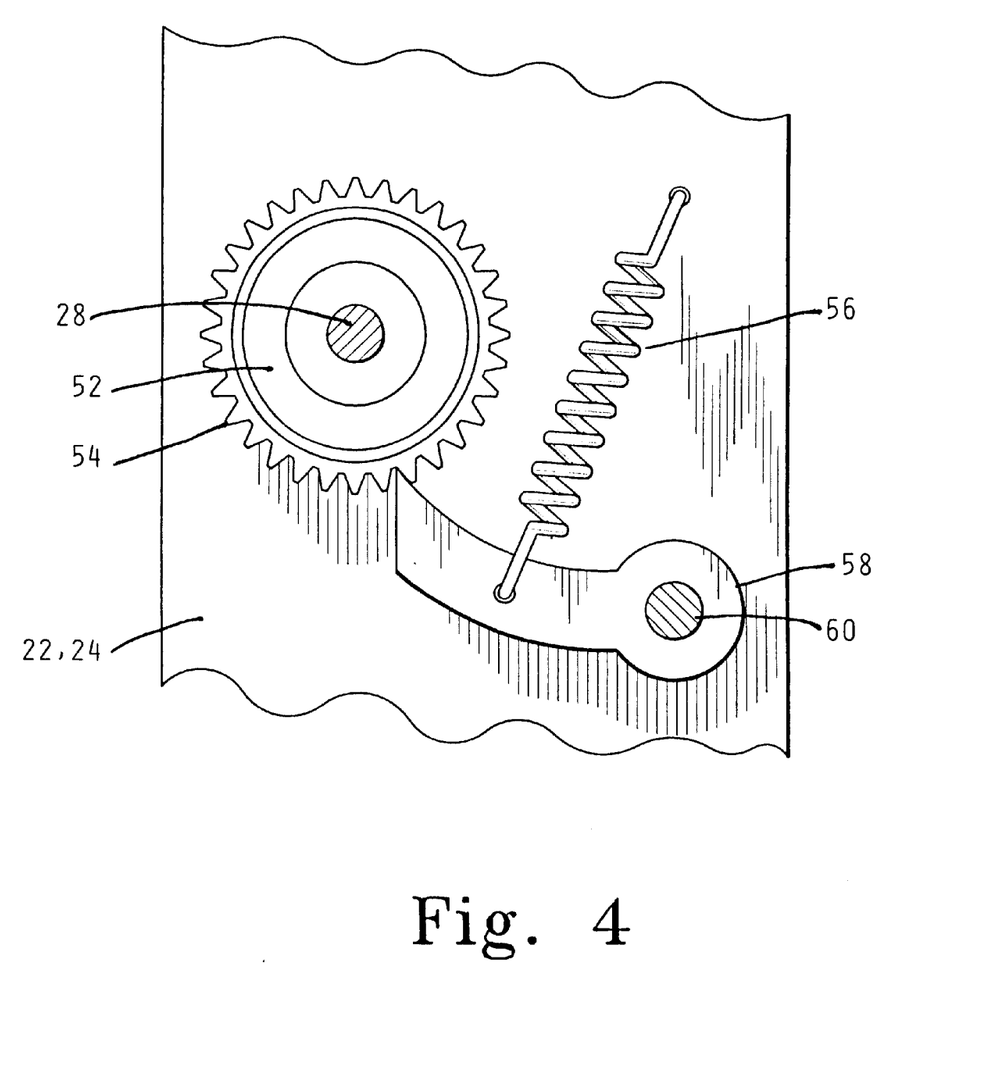
FIG. 4 is a side elevation view of a safety feature comprising a circular cam and its cooperative cam follower, the cam being carried on a drive shaft, and the cam follower being pivotally carried on associated framing, the cam follower being shown as spring-biased to engage the cam's teeth to lock against reverse travel of the movable carrier body but permitting its forward motion, thus achieving a safety against reverse travel of the movable carrier body and its support shelves.

Further safety is integrated into the apparatus 10 by the provision of a cam mechanism which is operative to restrict movement of the chains 34. That is, as shown, a cam 52 is keyed to the driver shaft 28 which is carried by the main support members 24 adjacent their bottom; and the cam 52 has on it a circumferential series of teeth 54 into which is spring-pressed (shown by spring 56) and a cam follower body 58 is pivotally carried on an axle 60 which is fixed to the frame 22/24, and is spring-urged to a position in which the end of the follower body 58 which is remote from its axle 60 engages the cam teeth 54 in a manner blocking rotation of the driver shaft's axis 28 permitting rotation in only a direction such that the chains 34 can go only in a route in which the shelf bracket 40 which is the one which is carrying the work object 12, is travelling upwardly.

Figure 5:
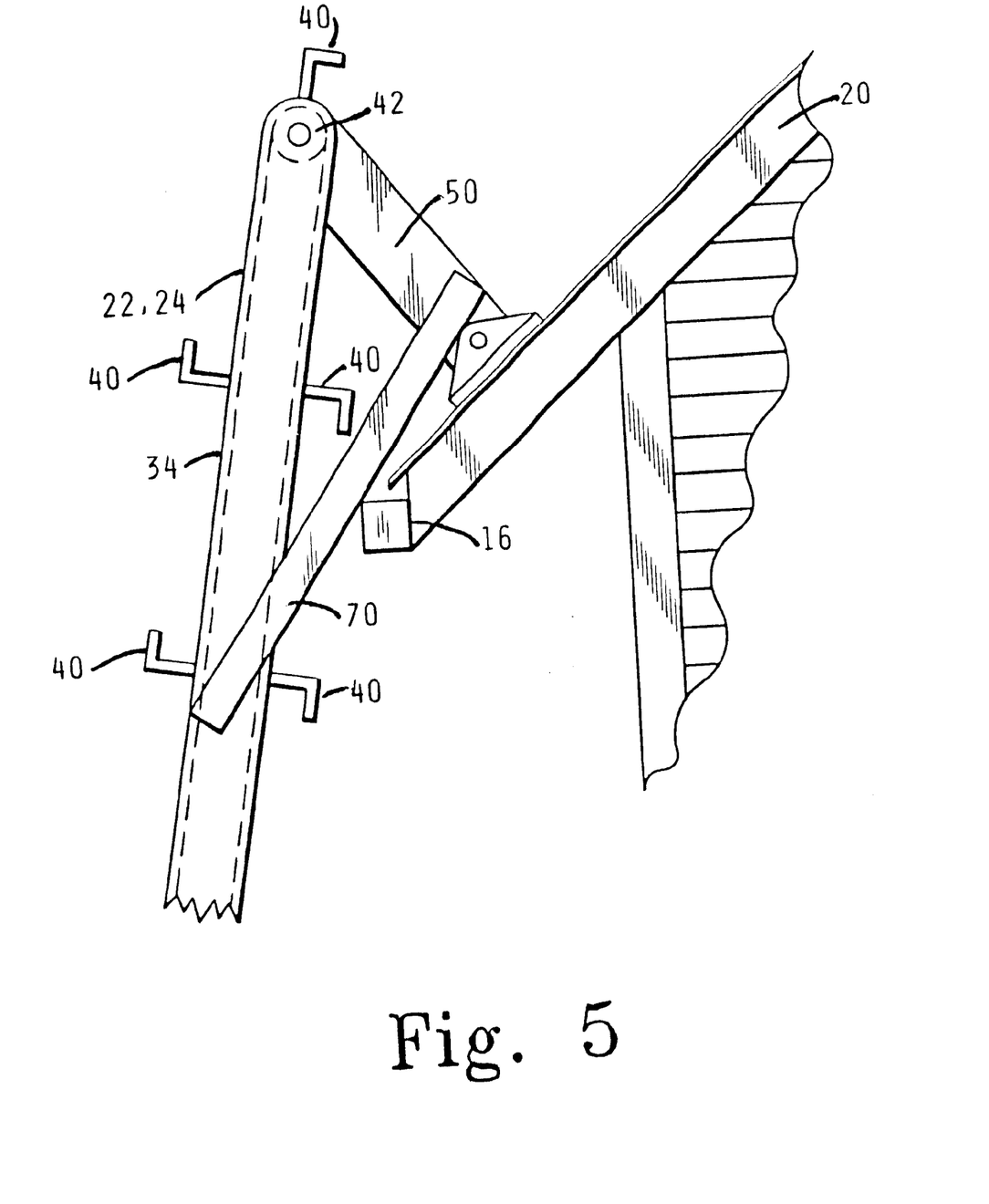
FIG. 5, in about twice the scale of FIG. 1, is a fragmental detailed view of the upper end of the main frame, for clearer illustration of the bar gutter guard which assures against engagement of a main frame portion against the house gutter, presenting a destructive engagement of the house gutter.

The combination also somprises the feature of an angle bar gutter guard member 70 carried near the top of each of the main support members 24, which provides an abutment closer to the foremost roof portion than is the top portion of the main support members 24, thus assuring, by the abutting engagement of the bar gutter guard 70, against damage to the house gutter 20 itself.

Safety and operativity are also provided, in that the combination also comprises the feature of a telescoping foot support 64 for each of the main support members 24, to provide an adjustment of height accommodative of variations of the ground 14.

Conclusion as to Inventive Combination

It is thus seen that a mechanicalized transfer device assembly constructed and used according to the combination of inventive concepts and details herein set forth, provides novel concepts of a desirable and usefully advantageous article and procedure, yielding advantages which are and provide special and particular advantages when used as herein set forth.

In summary as to the nature of the overall assembly's advantageous concepts, their novelty and inventive nature is shown by novel features of concept and construction shown here in advantageous combination, and by the novel concepts even though other shingles carrying devices may have known and used, but because the achievement is not what is or has been suggested to those of ordinary skill in the art, especially realistically considering this as a novel combination and needs comprising components which individually are similar in nature to what is well known to many persons, surely including most professionals and other workmen in the field for a number of years, throughout the entire world. No prior art component or element has even suggested the modifications of any other prior art to achieve the particulars of the novel concepts of the overall combination here achieved, with the special advantages which the overall combination article provides; and this lack of suggestion by any Prior Art has been in spite of the long worldwide use of heavy bundles of shingles.

The differences of concept and construction as specified herein yield advantages over the Prior Art; and the lack of this invention by the Prior Art, as a Prior Art combination has been in spite of this invention's apparent simplicity of the construction once the concepts have been conceived, in spite of the advantages it would have given, and in spite of the availability of all the materials to all persons of the entire world, and the invention's procedure learnability.

Quite certainly this particular combination of Prior Art details as here presented in this overall combination has not been suggested by the Prior Art this achievement in its particular details and utility being a substantial and advantageous departure from Prior Art, even though the Prior Art has had similar components for numbers of years. And particularly is the overall difference from the Prior Art significant when the non-obviousness is viewed by a consideration of the subject matter of this overall device as a whole, as a combination integrally incorporating features different in their combination from the Prior Art, in contrast to merely separate details themselves, and further in View of the Prior Art not achieving particular advantages here achieved by this combination.

Accordingly, it will thus be seen from the foregoing description of the invention according to this illustrative embodiment, considered with the accompanying Drawings, that the present invention provides new and useful concepts of a novel and advantageous article and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

What is claimed is:

1. A building material transfer device for raising items of building materials from an attendant standing on the ground to a raised position operatively adjacent the associated roof's foremost portion, the device comprising, in combination, features as follows:
a frame member comprising a pair of longitudinally extending main support members,
connector means holding the main support members in fixed relationship:
a driver shaft carried by the main support members adjacent the bottom thereof;
an electric motor which is provided with circuitry including control switching means for starting, stopping, and re-starting;
a pair of chains;
a pair of driver sprockets operatively keyed to the driver shaft, each of the chains passing under a respective one of the driver sprockets and operative to receive power from the driver shaft;
the pair of driver sprockets carried by the driver shaft and respectively located adjacent one of the said main support members,
the driver shaft extending outwardly through one of the main support members and adapted to receive rotational power from the associated electric motor,
there being a plurality of shelf brackets affixed to each of the chains adjacent the said main support members, the respective shelf brackets being spaced along said chain such as to accommodate items of building materials between adjacent shelf brackets;
there being one of more sets of idler sprockets carried respectively on shafts supported by the main support members; the set of idler sprockets which are adjacent the top of said main support members being spaced respectively close to the respective main support member, both of said top sprockets being in the plane of the respective drive sprocket, the main support members being provided with base portions for accepting support from the ground, such that the lowermost one of the shelf brackets is at a convenient height to accommodate the attendant's task in loading an item of associated building material thereon.

2. A building material transfer device according to claim 1, in which the combination also comprises the feature of cooperative gearing on the motor and the driver shaft being of a step-down relative nature for providing a slow revolving speed of the driver shaft in comparison to the speed of the output shaft of the associated electric motor.

3. A building material transfer device according to claim 1, in which the combination also comprises the feature of a baffle carried by the main support members at a location thereon which, when the device is placed into operational position adjacent the foremost portion of the roof, the baffle is operative to provide that each item of bundle passing the top dead-center of the foremost position of the roof will baffle the item or bundle laterally for ease of acceptance by an attendant standing on the roof, the baffle thus providing a receiver leg helping to avoid pileup of items and/or building material bundles.

4. A building material transfer device according to claim 1, in which the combination also comprises the features of a safety mechanism which is operative to restrict the direction of movement of the chains, the safety mechanism comprising:

a cam keyed to the driver shaft, the cam having a circumferential series of teeth, and having a follower body, and the cam follower body is pivotally carried on an axle which, is fixed to the frame, and is spring-urged to a position in which the end of the follower body remote from its axle engages the cam teeth in a manner permitting rotation of the driver shaft axle in only a direction such that the chains can go only in a route in which the shelf bracket, which is the one which is carrying the work object, is travelling upwardly.

5. A building material transfer device according to claim 1, in which the combination also comprises the feature of an angle bar gutter guard member carried near the top of each of the main support members, which provides an abutment closer to the foremost roof portion than is the top portion of the main support members, thus assuring by the abutting engagement of the bar gutter guard rather than the foremost roof portion.

6. A building material transfer device according to claim 1, in which the combination also comprises the feature of a telescoping foot support for each of the main support members, to provide an adjustment of height thereof accommodative of variations of the ground.

7. A building material transfer device according to claim 1, in which the overall arrangement is such that with the motor turned on and an item of building materials deposited on a shelf bracket, the item will be carried by the shelf bracket upwardly to a position adjacent the pair of topmost idler sprockets; and, as the chains cause the shelf bracket to pass adjacent a top dead-center position the item will then fall off the shelf bracket onto the roof, the control switching then providing that the motor will stop until the control switching is actuated to be operative to restart the motor, and after said re-starting, the motor and the chains will be operative to cause that shelf bracket now emptied of its item to travel downwardly with the motor again running until another shelf bracket has moved upwardly to actuate the stop means.

* * * * *